United States Patent

Takahashi et al.

[11] Patent Number: 5,609,386
[45] Date of Patent: Mar. 11, 1997

[54] STRUCTURE OF FRAME CONNECTING PORTION IN VEHICLE

[75] Inventors: Akio Takahashi; Yoshio Abe; Hideaki Takaishi, all of Wako, Japan

[73] Assignee: Honda Giken Kogyo Kabushiki Kaisha, Tokyo, Japan

[21] Appl. No.: 503,238

[22] Filed: Jul. 17, 1995

[30] Foreign Application Priority Data

Jul. 21, 1994 [JP] Japan .................................. 6-190175

[51] Int. Cl.[6] .................................. B60R 27/00
[52] U.S. Cl. .................. 296/204; 296/30; 280/800
[58] Field of Search .................. 296/204, 203, 296/29, 30; 280/781, 800

[56] References Cited

U.S. PATENT DOCUMENTS

| | | | |
|---|---|---|---|
| 4,450,926 | 5/1984 | Suzuki | 180/312 |
| 4,457,555 | 7/1984 | Draper | 296/186 |
| 4,462,629 | 7/1984 | Todori et al. | 296/30 |
| 4,514,008 | 4/1985 | Watanabe et al. | 296/204 |
| 4,563,035 | 1/1986 | Hirakami et al. | 296/195 |
| 4,804,222 | 2/1989 | Sakiyama et al. | 296/203 |
| 4,900,083 | 2/1990 | Kumasaka et al. | 296/197 |
| 5,102,187 | 4/1992 | Harasaki | 296/204 |
| 5,127,704 | 7/1992 | Komatsu | 296/204 |
| 5,195,780 | 3/1993 | Inoue et al. | 280/834 |
| 5,370,438 | 12/1994 | Mori et al. | 296/203 |

*Primary Examiner*—David M. Mitchell
*Assistant Examiner*—Jonathan J. Yun
*Attorney, Agent, or Firm*—Armstrong, Westerman, Hattori, McLeland & Naughton

[57] ABSTRACT

A structure of a frame connecting portion capable of firmly connecting a floor frame member to a side frame member in an automobile is provided. An end portion of the floor frame member provided on the floor panel, having an approximately U-shaped cross section and reinforced by the frame stiffener, is connected to an end portion of the side frame member having an approximately U-shaped cross section. At the connecting portion, the frame stiffener, floor frame member and side frame member are stacked on each other and tied integrally by tightening means penetrating them.

1 Claim, 2 Drawing Sheets

5,609,386

STRUCTURE OF FRAME CONNECTING PORTION IN VEHICLE

BACKGROUND OF THE INVENTION

This invention relates to a construction of a connecting portion between a floor frame member and a side frame member in a vehicle such as an automobile.

For example, Japanese Laid-Open Utility Model Publication No. Hei 2-120291 (1990) discloses a frame connecting portion of an automobile in which a front side member is connected to a front end of a front floor stringer (floor frame member) provided on a front floor pan (floor panel). The frame connecting portion is constructed in such a manner that the front floor stringer and the front side member are stacked, one upon another, a lower end of a dash panel is inserted between them, along their stacked surfaces and these three members are fixed to each other.

Hitherto, in such a frame connecting portion, as described above, the frame members have been connected to each other by spot welding or MIG welding.

However, the frame connecting portion connected by spot welding, or MIG welding, has the following problems.

In order to obtain a necessary and sufficient strength against strong and large energy given to the frame connecting portion, a large number of welding points and a long welding line are required so that a space large enough for a welding gun is necessary on both sides of the welded portion. As the result, a large hole must be bored at the floor panel side and is apt to cause depreciation of the floor panel rigidity.

In addition, the spot welding and MIG welding are likely to cause a large decrease in performance according to various conditions.

Further, the performance of the spot welding varies with plate thickness. Thus, there is a limit in a weldable plate thickness.

SUMMARY OF THE INVENTION

The present invention overcomes the foregoing problems. According to the present invention, in a structure of a frame connecting portion in a vehicle in which an end portion of a floor frame member, provided on a floor panel having an approximately U-shaped cross section and reinforced by a frame stiffener, is connected to an end portion of a side frame member having an approximately U-shaped cross section, the frame stiffener, the floor frame member and the side frame member are stacked on each other and tied integrally by tightening means penetrating the stacked stiffener and members at the point of stacking.

In the above invention, because the frame members are tied to each other by a tightening member, such as, a bolt or the like, there is no limitation as to plate thickness and no deterioration of connecting strength occurs, even if many members are stacked.

In addition, the frame connecting portion can satisfactorily support a large external force applied to the portion with very few tightening members. For example, when the connecting portion of an ordinary automobile are bolted, only two or three bolts are required. To obtain an equal strength by spot welding, many welding spots are necessary resulting in enlarging the area of the stacked portion and increasing the weight.

In the present invention, further, a space for operation of the welding gun is unnecessary, so that there is no need to bore a large hole at the floor panel. Therefore, the present invention is advantageous for ensuring strength and rigidity of the vehicle body.

DETAILED DESCRIPTION OF THE PREFERRED EMBODIMENT

Figure 1:
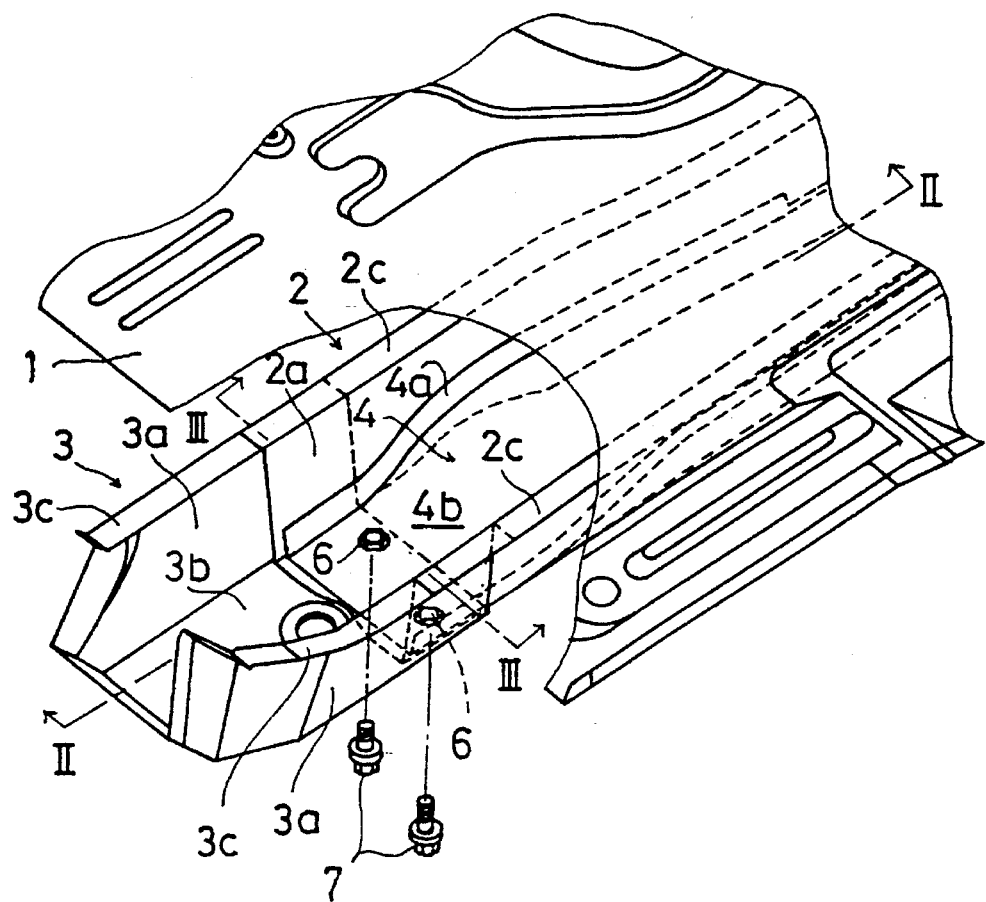
FIG. 1 is a perspective view, partially broken away, showing a frame connecting portion in an automobile according to a preferred embodiment of the invention.
Figure 2:
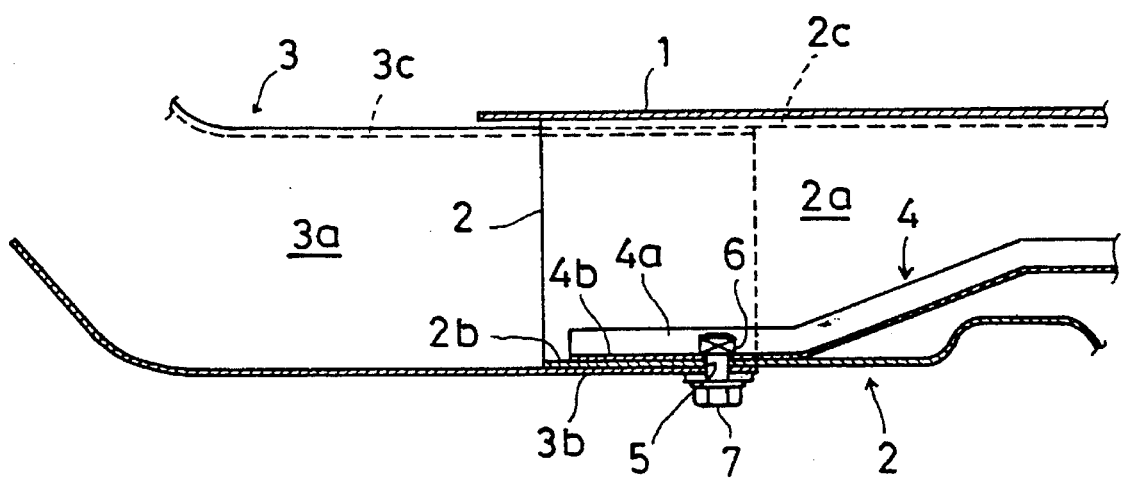
FIG. 2 is a sectional view taken along line II—II of FIG. 1.
Figure 3:
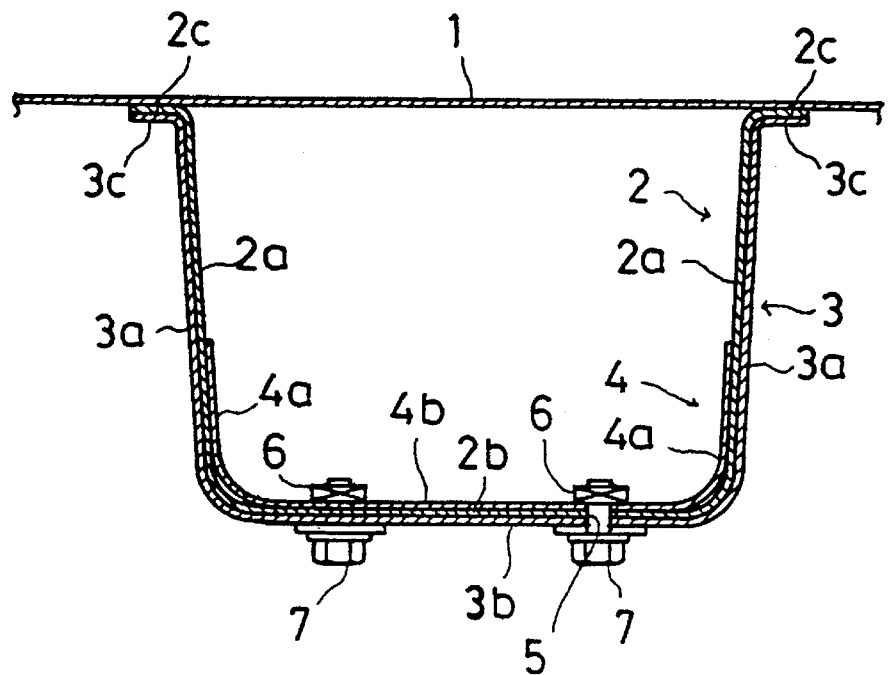
FIG. 3 is a sectional view taken along the line III—III of FIG. 1.

FIGS. 1–3 show one embodiment of the invention. Reference numeral, "1" denotes a floor panel. At a side edge portion of the under surface of the floor panel 1 is provided a floor frame member 2 extending in a front to rear direction. The floor frame member 2 is composed of side plate sections 2a, 2a at both sides and a bottom plate section 2b connecting both lower edges of the side plate sections 2a, 2a and has an approximately U-shaped cross section. Further, the floor frame member 2 has flange sections 2c formed by bending upper edges of the side plate sections 2a, 2a and is fixed to the under surface of the floor panel 1 with the flange sections 2c abutting on the under surface.

Reference numeral "3" denotes a side frame member of a front body (not shown). The side frame member 3 also has an approximately U-shaped cross section composed of both side plate sections 3a, 3a and a bottom plate section 3b and has flange sections 3c formed by bending upper edges of the side plate sections 3a, 3a. The side frame member 3 and the floor frame member 2 are aligned with each other in the front and rear directions, and a front end of the floor frame member 2 is fitted within a rear end of the side frame member 3 in such a manner that the side plate sections 3a, 3a and the bottom plate section 3b of the side frame member 3 are disposed along the outer surface of the side plate sections 2a, 2a and the bottom plate section 2b of the floor frame member 2 while the flange sections 3c are along the under side of the flange sections 2c.

On the other hand, a frame stiffener 4 is fitted within the floor frame member 2 and extended in the front and rear direction along the floor frame member 2 for reinforcement of the member. The frame stiffener 4 also has an approximately U-shaped cross section composed of both side plate sections 4a, 4a and a bottom plate section 4b. However, the height of the frame stiffener 4 is lower than those of the floor frame member 2 and the side frame member 3. The frame stiffener 4 extends in a transverse direction between side plates 2a, 2a of the floor frame member 2 with the side plate sections 4a abutting on the side plate sections 2a at an intermediate height position. As shown best in FIG. 2, the position of the frame stiffener 4 is lowered gradually as it approaches the front end of the floor frame member 2, and at the front end, the bottom plate section 4b of the frame stiffener 4 and the bottom plate section 2b of the floor frame member 2 come in contact with each other and are stacked.

Namely, at the connecting portion of the floor frame member 2 and the side frame member 3, side plate sections 4a, 2a, 3a, overlaps and, are stacked with the side plate section 2a in the middle, and bottom plate sections 4b, 2b, 3b stacked with the bottom plate section 2b of the floor frame member in the middle.

Each of the bottom plate sections 4b, 2b, 3b, stacked, as stated above, has aligned through hole 5, and a nut 6 aligned with the through hole 5 on the bottom plate section 4b of the frame stiffener 4. A bolt 7 is inserted into the through-holes 5 from the under side, that is, from the side of the front body side frame member 3 and threaded into nut 6. Thus, the bottom plate sections 4b, 2b, 3b are pinched between joint seat faces of the bolt side and the nut side and firmly fixed there between by a fixed seat.

Since the area of the aforesaid fixed seat face is considerably large, compared with a joint area per one point of the spot welding, a strong tightening force can be obtained by a small number of bolts 7 and nuts 6. Particularly, when the side frame member 3 is subjected to a force so as to move it downward and strip it from the floor frame member 2, the axial compressing force by the bolt 7, acting between the side frame member 3 and the floor frame member 2, is opposed to the aforesaid force and prevents the stripping of the side frame member 3 from the floor frame member 2 very effectively.

The tying by bolt and nut, as mentioned above, is not restricted by thickness of plate members to be tied so that it is always applicable regardless of plate thicknesses of the floor frame member 2, side frame member 3 and frame stiffener 4. Because the required number of the bolts 7 is few, the stacked portions of the floor frame member 2 and the side frame member 3 can be small and reduce the weight of the vehicle body. In addition, because it is necessary only to insert the bolt 7 in the through-hole 5 for tying the frame members, it is unnecessary to provide a hole for a tying operation to the floor panel 1 and even if the hole is provided, a small hole will be sufficient so that any deterioration of rigidity of the floor panel 1 is minimized.

Figure 4:
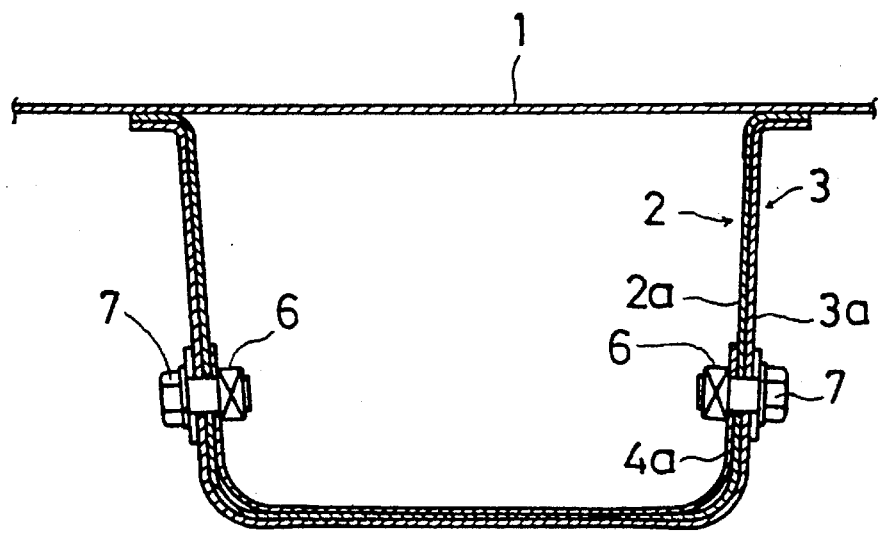
FIG. 4 is a sectional view similar to FIG. 3 showing another preferred embodiment of the invention.

In the above-described embodiment, the bottom plate sections 4b, 2b, 3b of the frame stiffener 4, floor frame member 2 and side frame member 3 stacked on each other are tied with the bolts 7 and nuts 6. However, as shown in FIG. 4, the side plate sections 4a, 2a, 3a stacked from the sides on each other may be tied by the bolt 7 and nut 6 in the same manner. Also, both of the bottom plate sections 4b, 2b, 3b and the side plate sections 4a, 2a, 3a may be tied accordingly.

The tightening member in the invention is not limited to the bolt and nut, and other substitutes, for example, a rivet, or the like, can be used.

As obvious from the above, according to the present invention, a floor frame member, with a frame stiffener and a side frame member, can be connected firmly without being restricted by plate thickness and moreover areas of stacked portions of respective members can be reduced to reduce the weight. In addition, because it is unnecessary to provide a large hole to the floor panel for connecting the frame members, a superior vehicle body rigidity can be advantageously ensured.

What is claimed is:

1. A frame connecting portion for a vehicle comprising:

a floor panel;

a longitudinally extending floor frame member disposed beneath said floor panel, said floor frame member having a bottom plate section and oppositely spaced side sections upstanding from said floor frame member bottom plate section defining a substantially U-shaped cross-section;

means on upper portions of said floor frame member side sections supportingly engaging said floor panel;

a side frame member having a bottom plate section and opposed side plate sections upstanding from said side frame member bottom plate section defining a substantially U-shaped cross-section and receiving corresponding sides and bottom plate sections of said floor frame member in stacked, continuous, mutually contiguous engagement;

a frame stiffener having a bottom plate section and opposed side plate sections upstanding from said frame stiffener bottom plate section, at least a portion of said frame stiffener being in stacked, continuous, mutually contiguous engagement with said bottom plate section and said side sections of said side frame member; and means for integrally joining said frame members and said stiffener member including a plurality of mutually aligned through-holes extending through contiguous sections of said members and tightening means defined by nut and bolt means extending through said through-holes operative for securing sections of said members in tight, mutually contiguous engagement.

* * * * *